(12) United States Patent
Shori

(10) Patent No.: US 7,633,990 B2
(45) Date of Patent: Dec. 15, 2009

(54) MULTI-WAVELENGTH PUMP METHOD FOR IMPROVING PERFORMANCE OF ERBIUM-BASED LASERS

(76) Inventor: Ramesh K. Shori, 9501 Shoshore Ave., Northridge, CA (US) 91325

( * ) Notice: Subject to any disclaimer, the term of this patent is extended or adjusted under 35 U.S.C. 154(b) by 17 days.

(21) Appl. No.: 11/811,177

(22) Filed: Jun. 8, 2007

(65) Prior Publication Data

US 2007/0297482 A1   Dec. 27, 2007

Related U.S. Application Data

(60) Provisional application No. 60/812,355, filed on Jun. 8, 2006.

(51) Int. Cl.
*H01S 3/091* (2006.01)

(52) U.S. Cl. .............. 372/70; 372/69; 372/71; 372/75

(58) Field of Classification Search .......... 372/69, 372/70, 71, 75
See application file for complete search history.

(56) References Cited

U.S. PATENT DOCUMENTS

| | | | |
|---|---|---|---|
| 4,589,118 A | 5/1986 | Suzuki et al. | |
| 5,140,456 A | 8/1992 | Huber | |
| 5,157,683 A | 10/1992 | Millar et al. | |
| 5,247,529 A * | 9/1993 | Heidemann | ............ 372/23 |
| 5,710,659 A | 1/1998 | Cline | |
| 5,936,763 A | 8/1999 | Mitsuda et al. | |
| 6,028,977 A | 2/2000 | Newsome et al. | |
| 6,278,719 B1 | 8/2001 | Ohishi et al. | |
| 6,407,853 B1 | 6/2002 | Samson et al. | |
| 6,429,964 B1 | 8/2002 | Delavaux et al. | |
| 6,459,846 B1 | 10/2002 | Choi et al. | |
| 6,510,276 B1 * | 1/2003 | Jain et al. | ............ 385/142 |
| 6,611,372 B1 | 8/2003 | Peyghambarian et al. | |
| 6,650,663 B1 | 11/2003 | Diening et al. | |
| 6,810,052 B2 | 10/2004 | Chicklis et al. | |
| 6,816,514 B2 | 11/2004 | Jiang et al. | |

(Continued)

FOREIGN PATENT DOCUMENTS

EP      0 561 672      9/1993

(Continued)

OTHER PUBLICATIONS

M. Robinson, D. P. Devor, "Thermal switching of laser emission of $Er^{3+}$ at 2.69 μm and $Tm^{3+}$ at 1.86 μm in mixed crystals of $CaF_2$:$ErF_3$:$TmF_3$" *Applied Physics Letters* 10, 167-170, 1967.

(Continued)

*Primary Examiner*—Minsun Harvey
*Assistant Examiner*—Tod T Van Roy
(74) *Attorney, Agent, or Firm*—Cislo & Thomas, LLP

(57) ABSTRACT

A method for increasing the efficiency of generating lasers by pumping two separate wavelengths into an erbium-based medium to populate the $^4I_{11/2}$ state and depopulate the $^4I_{13/2}$ state. A first excitation wavelength region is located between approximately 955 nm to approximately 1100 nm. The second excitation wavelength region is located between approximately 1600 nm to approximately 1850 nm. This multi-wavelength pumping scheme may be operated in continuous wave or quasi-continuous wave mode.

11 Claims, 5 Drawing Sheets

U.S. PATENT DOCUMENTS

| | | | |
|---|---|---|---|
| 6,891,878 | B2 | 5/2005 | Spariosu et al. |
| 2004/0240488 | A1* | 12/2004 | Okada et al. ............... 372/6 |
| 2004/0246568 | A1 | 12/2004 | Onaka et al. |
| 2005/0047466 | A1* | 3/2005 | Spariosu et al. ............. 372/70 |
| 2005/0100073 | A1* | 5/2005 | Hughes et al. ............... 372/70 |
| 2006/0039061 | A1 | 2/2006 | Chi et al. |

FOREIGN PATENT DOCUMENTS

| | | |
|---|---|---|
| GB | 2 241 949 | 9/1991 |
| WO | WO 93/21670 | 10/1993 |
| WO | WO 94/15385 | 7/1994 |
| WO | WO 2005/002008 | 1/2005 |

OTHER PUBLICATIONS

M. J. Weber et al, "Optical Intensities of Rare-Earth ions in Yttrium Orthoaluminate," *Physical Review B*, 8(1), 47-53, 1973.

A. A. Kaminskii et al, "Spectroscopic and 3 µm stimulated emission of $Er^{3+}$ ions in the $(Y_{1-x}Er_x)_3Al_5O_{12}$ and $(Lu_{1-x}Er_x)_3Al_5O_{12}$ garnet crystal systems," Phys. *Status Solidi A* 71, 291-312, 1982.

B. Dinnerman, P. F. Moulton, "3-µm cw laser operations in erbium-doped YSGG, GGG, YAG," *Optics Letters* 19, 1143-1145, 1994.

M. Pollnau, "The route toward a diode-pumped 1-W erbium 3-µm fiber laser," *IEEE J. Quantum Electron*. 33, 1982-1990, 1997.

Da Wu Chen et al, "Diode-Pumped 1-W continuous wave Er:YAG 3µm laser," *Optics Letters*, 24(6), 385-387, 1999.

C. Ziolek et al, "High-repetition-rate, high-average-power, diode-pumped 2.94 µm Er:YAG laser," *Optics Letters*, 26(9), 599-601, 2001.

L. G. Van Uitert, L. F. Johnson, "Energy transfer between rare-earth ions," *Journal of Chemical Physics*, 44 (9), 3514-3522, 1966.

W. Shi et al, Effects of energy transfer among $Er^{+3}$ ions on the fluorescence decay and lasing properties of heavily doped $Er:Y_2Al_3O_{12}$, *JOSA B*, 7 (8), 1456-1462, 1990.

Q. Y. Wang et al, "Effect of the concentration of the $Er^{+3}$ ion on the spectral intensity parameters of Er:YAG crystals," *Journal of Alloys and Compounds*, 202, 1-5 1993.

V. Lupei et al, "On the dynamics of population inversion for 3 µm $Er^{+3}$ lasers," *Journal of Quantum Electronics*, 29(2), 426-434, 1993.

* cited by examiner

MULTI-WAVELENGTH PUMP METHOD FOR IMPROVING PERFORMANCE OF ERBIUM-BASED LASERS

CROSS-REFERENCES TO RELATED APPLICATIONS

This utility patent application claims the benefit of U.S. Provisional Patent Application Ser. No. 60/812,355, filed Jun. 8, 2006.

FIELD OF THE INVENTION

This invention relates to the method of enhancing the performance of lasing media.

BACKGROUND

For certain applications, it is desirable to use mid-infrared lasers that directly emit radiation between wavelengths in the 2-5 micron region operating at pulse repetition frequency (PRF) ranging between 1 Hz-100 kHz or in continuous wave, and which can also be scalable in terms of their output power. Erbium-based (Er-based) lasers, operating on the $^4I_{11/2} \rightarrow {}^4I_{13/2}$ transition, have been shown to emit radiation between approximately 2.6 to approximately 3 microns. The terminal lasing state in the above-mentioned Er-based lasers self-terminates due to long fluorescent lifetime of the $^4I_{13/2}$ lower lasing state ($\tau \sim 2.5$-7.5 msec) relative to the $^4I_{11/2}$ upper lasing state ($\tau \sim 0.09$-1.5 msec). To a first order approximation, the highest pulse repetition frequency that can be achieved in these lasers is inversely proportional to the fluorescent lifetime of the lower lasing state (in this case, the $^4I_{13/2}$ state). In the case of the nominally 50% doped Er:YAG laser medium which emit radiation at approximately 3 microns wavelength, the 2.5-7.5 msec fluorescent lifetime of the $^4I_{13/2}$ state implies that the highest PRF operation is still less than 1 kHz. In order to achieve operation at PRF greater than few 100 Hz, the effective fluorescent lifetime of the $^4I_{13/2}$ state in Er must be reduced to a value approximately equal to the reciprocal of the desired PRF value and/or the population of the $^4I_{13/2}$ state must be significantly reduced to or below that of the population of the $^4I_{11/2}$ state so as to minimize or eliminate the above-mentioned self-termination process. It has been well documented in published literature that the effective fluorescent lifetime of the $^4I_{13/2}$ state in Er decreases with increasing Er doping concentration.

In addition, the approximately 3 micron lasing action (especially the continuous wave mode of operation) which occurs as a result of the $^4I_{11/2} \rightarrow {}^4I_{13/2}$ transition in Er, is highly dependent on the upconversion process as this energy transfer mechanism assists in alleviating the self-termination process (see FIG. 1). Two competing upconversion processes take place in Er. In one process, two Er ions in the $^4I_{13/2}$ state interact such that one of the two Er ions is de-excited to the $^4I_{15/2}$ ground state while the second Er ion is energized to the $^4I_{9/2}$ state which via a fast non-radiative process decays to the $^4I_{11/2}$ upper lasing state thus enhancing the population inversion between the upper and lower lasing states and the overall quantum efficiency of the lasing action. The energy given off by the Er ion decaying from the $^4I_{13/2}$ state to the $^4I_{15/2}$ ground state is identical to the energy gained by the Er ion in transitioning from the $^4I_{13/2}$ state to the $^4I_{9/2}$ state. The second upconversion process, involving two Er ions in the $^4I_{11/2}$ upper lasing state, results in exciting one Er ion to the $^4F_{7/2}$ state, while relaxing the second Er ion to the $^4I_{15/2}$ ground state. The former upconversion process is beneficial in that it removes two Er ions from the $^4I_{13/2}$ lower lasing state thereby assisting in the enhancement of the population inversion by depopulating of the $^4I_{13/2}$ lower lasing state. The latter upconversion process, while not preventing the generation of the ~3 micron radiation, is undesirable in that it takes two Er ions out of the $^4I_{11/2}$ upper lasing state thereby decreasing the net population inversion and thus negatively impacting the overall efficiency of the laser operation.

Much of the prior art, which aims to improve the lasing efficiency or enhance the PRF in Er-based lasers emitting at approximately 3 micron does so by attempting to promote the (beneficial) upconversion process involving two Er ions in the $^4I_{13/2}$ state and/or depopulating the $^4I_{13/2}$ state by codoping with certain other rare earth ions.

SUMMARY OF THE INVENTION

This invention is directed towards a method of improving lasing performance in terms of power scaling, PRF enhancement, or both, of an erbium-based medium comprising exposing the medium to a radiation of a first wavelength, such that a first erbium ion is excited from a first state to a second state and exposing the medium to a radiation of a second wavelength, such that a second erbium ion is excited from a third state to a fourth state; thereby populating the second state and reducing the population in the third state. In one embodiment, the first state is an $^4I_{15/2}$ ground state, the second state is an $^4I_{11/2}$ upper lasing state, the third state is an $^4I_{13/2}$ lower lasing state, and the fourth state is one or more Stark levels in one of the higher states.

DETAILED DESCRIPTION OF THE EMBODIMENTS

The detailed description set forth below in connection with the appended drawings is intended as a description of exemplary embodiments and is not intended to represent the only forms in which these embodiments may be constructed and/or utilized. The description sets forth the functions and the sequence of steps for constructing and operating the exemplary embodiments. It is to be understood, however, that the same or equivalent functions and sequences may be accomplished by different embodiments that are also intended to be encompassed within the spirit and scope of the specification.

Figure 1:
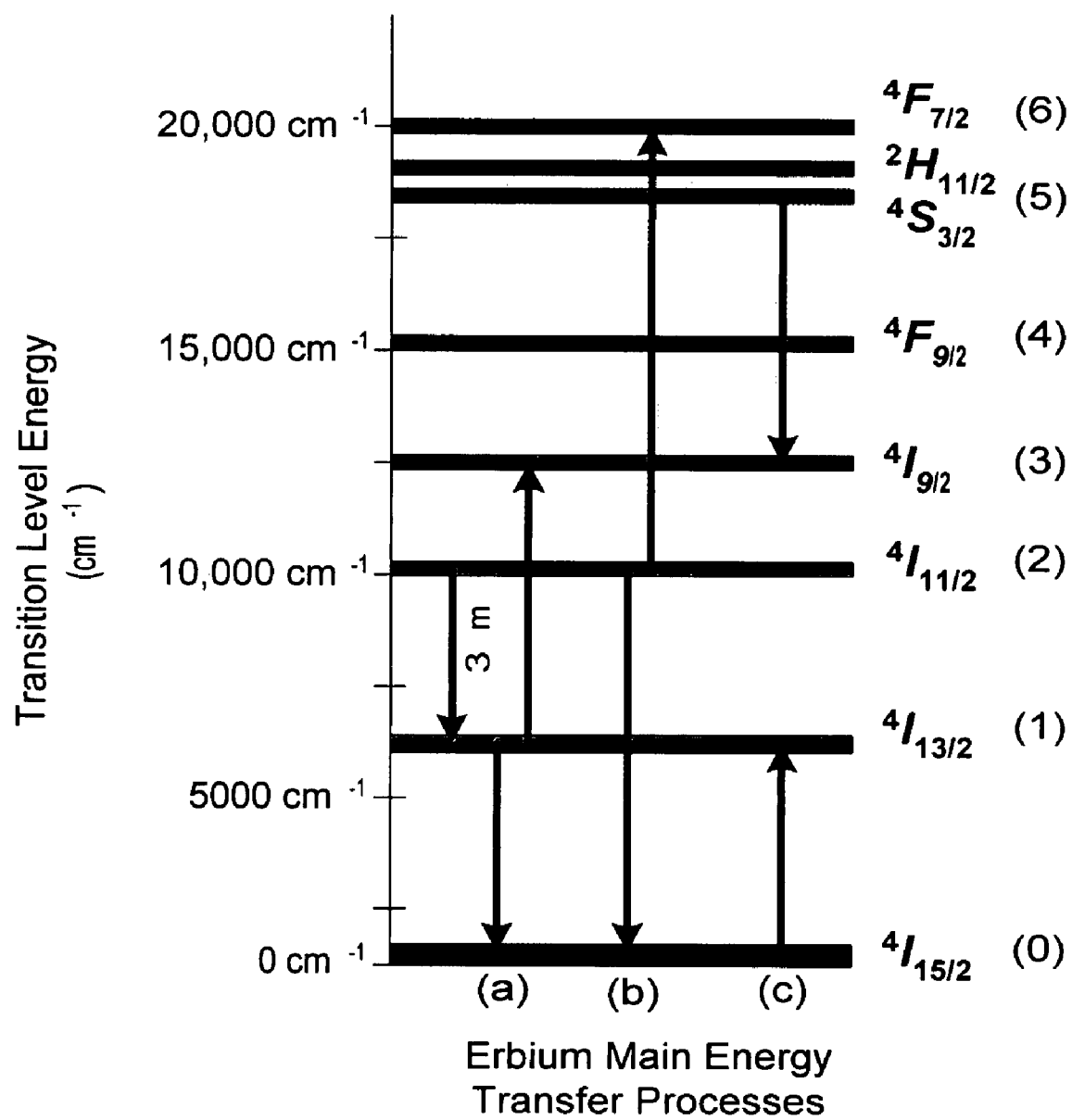
FIG. 1 is a primary energy transfer processes which occur in Er-based laser media.

As shown in FIG. 1, the lasing action occurs due to the $^4I_{11/2} \rightarrow {}^4I_{13/2}$ transition. Process (a) is the beneficial upconversion process. Process (b) is the undesired but weaker upconversion process. Process (c) is the cross-relaxation process.

Figure 2:
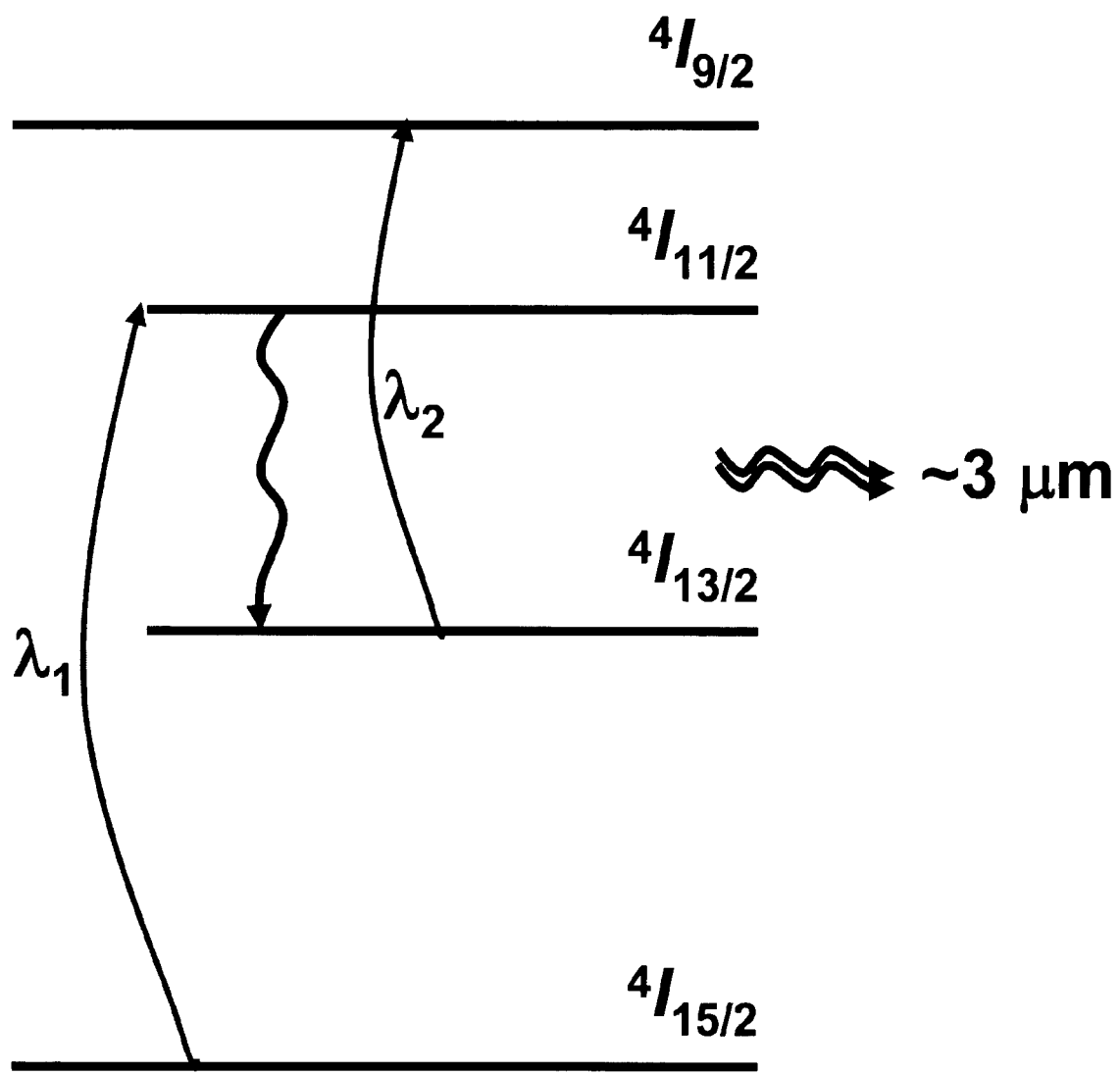
FIG. 2 is a diagram symbolizing a dual-wavelength excitation of Er-based laser gain media emitting radiation in the approximately 2.5 to 3.1 micron wavelength region in keeping with one embodiment of the present invention.
Figure 3:
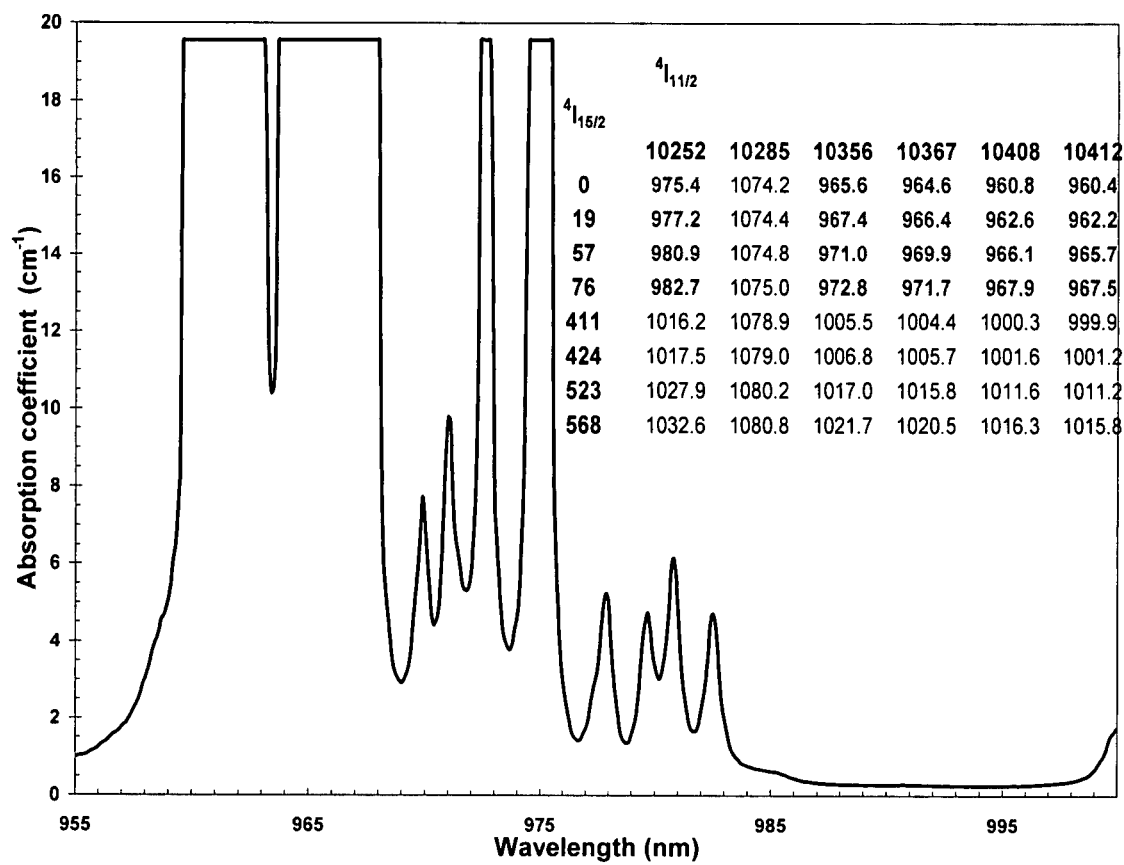
FIG. 3 is an absorption spectra for possible wavelength transitions between Stark levels in the $^4I_{15/2}$ and $^4I_{11/2}$ states.
Figure 5:
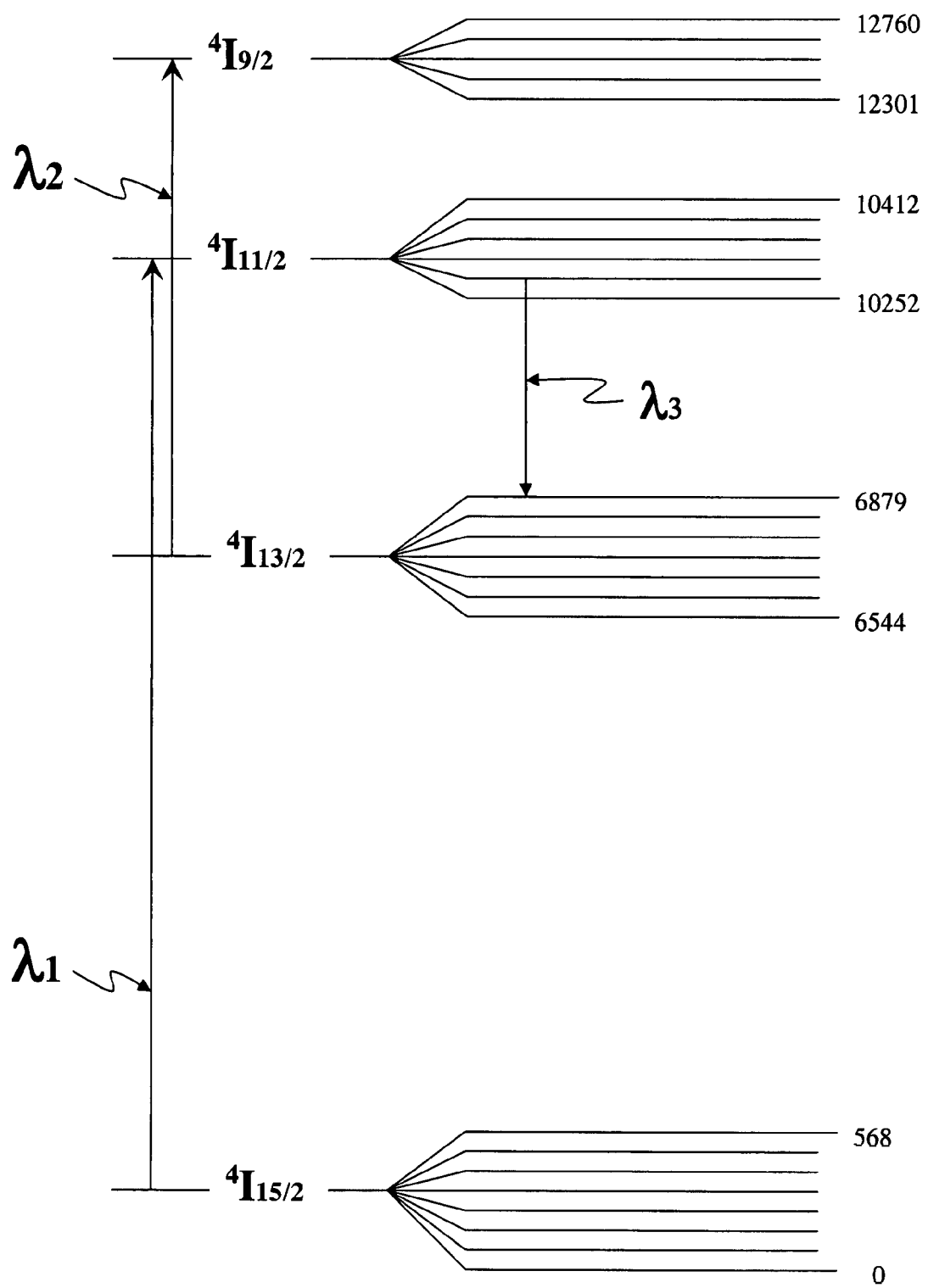
FIG. 5 is a detailed transition diagram shown in FIG. 2 including the Stark levels shown in FIGS. 3 and 4, in keeping with one embodiment of the current invention.

One method, in keeping with the present invention, involves excitation of the Er-based laser gain medium in two wavelength regions, as shown in FIGS. 2 and 5. In this embodiment, the first excitation wavelength region $\lambda_1$ is located between approximately 955 nm to approximately 1100 nm and excites the Er ions from the $^4I_{15/2}$ ground state to the $^4I_{11/2}$ upper lasing state, thereby creating the initial population inversion between the $^4I_{11/2}$ and $^4I_{13/2}$ states as a necessary condition to initiate the lasing action, as shown in FIG. 3.

By the foregoing multi-wavelength pumping method of this embodiment, one or more first erbium ions are excited from a first state to a second state, and one or more second erbium ions are excited from a third state to a fourth state. The first state being one or more of the Stark levels of $^4I_{15/2}$ ground state, the second state being one or more of the Stark levels of $^4I_{11/2}$ upper lasing state, the third state being one or more of the Stark levels of the $^4I_{13/2}$ lower lasing state, and the fourth state being on or more of the Stark levels of $^4I_{9/2}$ metastable state.

Figure 4:
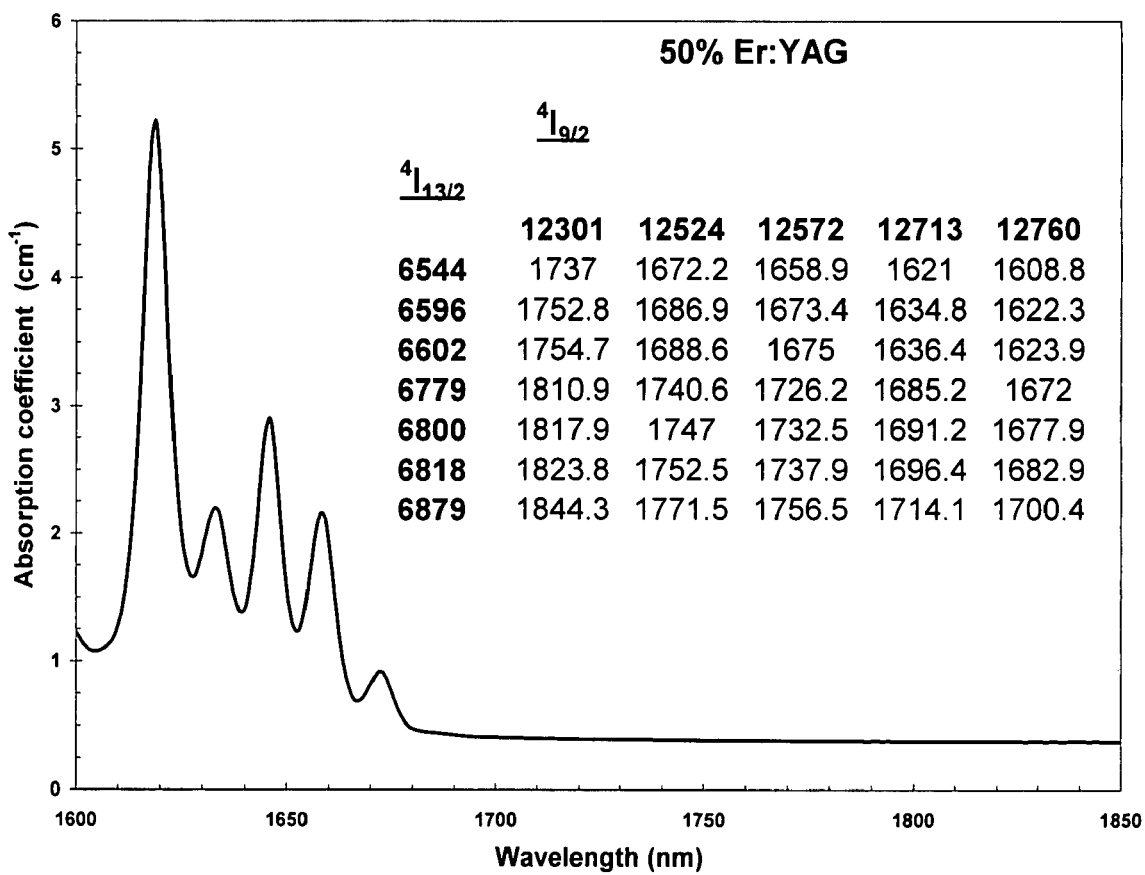
FIG. 4 is an absorption spectra for possible wavelength transitions between Stark levels in the $^4I_{13/2}$ and $^4I_{9/2}$ states.

As shown in FIG. 4, the second wavelength region $\lambda_2$ is between approximately 1600 to approximately 1850 nm to recycle the Er ions from the $^4I_{13/2}$ lower lasing state to the $^4I_{9/2}$ metastable state from where they non-radiatively decay to the $^4I_{11/2}$ upper lasing state. The present invention also takes into account that the Er ions from the $^4I_{13/2}$ lower lasing state may be recycled to a Stark level in the $^4I_{11/2}$ state above the one involved in the approximately 3 micron generation resulting in the most efficient overall energy conversion efficiency, or to one of the higher states (states 3-6 in FIG. 1) resulting in a lower overall energy conversion efficiency, still a significant improvement over an approach where no $\lambda_2$ pumping is involved. In either case, however, this multi-wavelength pumping method is to depopulate the $^4I_{13/2}$ state.

As shown in FIG. 5, for instance, Stark levels and their associated energy level values (in units of cm$^{-1}$) of the several energy states in Er:YAG provide a number of wavelengths potentially involved in depopulating the $^4I_{13/2}$ state. This is accomplished, first, by thermalizing down to lower Stark levels in the $^4I_{13/2}$ states, and second, by recycling up to one or more of the available Stark levels in the $^4I_{9/2}$ state, the $^4I_{11/2}$ state (not shown), or one of the higher states (also not shown), such as the higher states shown as states 3-6 in FIG. 1. The downward pointing arrow $\lambda_3$ indicates the dominant 2.94 µm laser transition in nominally, 50% doped Er:YAG.

In one embodiment, this multi-wavelength pumping method permits operation in high PRF mode, such as greater than 1 kHz. In another embodiment, this multi-wavelength pumping method can be operated in a continuous wave mode or a quasi-continuous wave mode. In one embodiment, the first excitation wavelength may be exposed to the medium before the second excitation wavelength. In one such embodiment, exposure to the first pump radiation may precede exposure to the second pump radiation by approximately 100 microseconds or greater.

In another embodiment, the second excitation wavelength may be exposed to the medium prior to the first excitation wavelength. In another embodiment, both excitation wavelengths may be applied simultaneously.

This embodiment differs significantly from other existing methods to depopulate the $^4I_{13/2}$ state in that it does not involve or rely upon any upconversion process. In addition, this embodiment works with commercially available Er-doped materials that are routinely used to generate the approximately 3 micron radiation, thus eliminating the need for any codoped Er-based media. This approach allows for high PRF operation by directly recirculating the Er ions in the $^4I_{13/2}$ lower lasing state to the $^4I_{9/2}$ state or higher lying states without having to completely decay to the $^4I_{15/2}$ ground state thereby increasing the overall efficiency of the laser. The second wavelength $\lambda_2$ may be selected by applying the selection rules from quantum mechanics and by avoiding or at least minimizing wavelengths which would excite the Er ions from the $^4I_{15/2}$ ground state to the $^4I_{13/2}$ state or coincide with the wavelengths that represent typical eye-safe wavelength generating transitions (most notably the approximately 1618 nm and approximately 1645 nm wavelengths associated with eye-safe Er:YAG lasers). The recirculation rate and thus the PRF value is proportional to pump energy and temporal pump pulse format of the power operating at the wavelength $\lambda_2$.

In closing, it is to be understood that the embodiments described herein are illustrative of the principles of the present invention. Other modifications that may be employed are within the scope of the invention. Thus, by way of example, but not of limitation, alternative configurations may be utilized in accordance with the teachings herein. Accordingly, the drawings and description are illustrative and not meant to be a limitation thereof.

What is claimed is:

1. A method of improving lasing efficiency of an erbium-based medium comprising:
   a. exposing the medium to a first pump radiation of a first wavelength, such that a first erbium ion is excited from a first state to a second state,
   b. thereby increasing the population of erbium ions in the second state, creating a population inversion necessary for lasing between the second state as the upper lasing state and a third state as the lower lasing state, said third state being different in energy level than the first state, and
   c. exposing the medium to a second pump radiation of a second wavelength, such that a second erbium ion is excited from the third state to a fourth state, thereby reducing the population of erbium ions in the third state, reducing a bottleneck created by erbium ions populating the third state, and improving the population inversion necessary for lasing between the second state and the third state, wherein the third state is an $^4I_{13/2}$ lower lasing state and the fourth state is an $^4I_{9/2}$ metastable state or a Stark level in the $^4I_{11/2}$ state above said second state, and wherein the lasing efficiency between the second state as the upper lasing state and the third state as the lower lasing state is improved.

2. The method of claim 1, wherein the medium is exposed to the first pump radiation and the second pump radiation generally simultaneously.

3. The method of claim 1, wherein the first state is an $^4I_{15/2}$ ground state and the second state is an $^4I_{11/2}$ upper lasing state.

4. The method of claim 1, wherein
   a. the first pump radiation has a wavelength between approximately 955 nanometers to approximately 1100 nanometers and wherein
   b. the second pump radiation has a wavelength between approximately 1600 nanometers to approximately 1850 nanometers.

5. The method of claim 1, wherein
   a. the first pump radiation has a wavelength region located between approximately 959 nanometers to approximately 985 nanometers and wherein
   b. the second pump radiation has a wavelength region located between approximately 1610 nanometers to approximately 1680 nanometers.

6. The method of claim 1, wherein
a. the first pump radiation has a wavelength region located between approximately 959 nanometers to approximately 976 nanometers and wherein
b. the second pump radiation has a wavelength region located between approximately 1610 nanometers to approximately 1680 nanometers.

7. The method of claim 1, wherein the first pump radiation and the second pump radiation are continuous waves.

8. The method of claim 1, wherein the first pump radiation and the second pump radiation are pulsed.

9. The method of claim 8, wherein the medium is exposed to the first pump radiation before to exposing the medium to the second pump radiation.

10. The method of claim 9, wherein the exposure to the first pump radiation precedes exposure to the second pump radiation by approximately 100 microseconds.

11. The method of claim 8, wherein the first pump radiation and the second pump radiation are pulsed with a pulse repetition frequency ranging between approximately 1 Hz to approximately 100 kHz.

* * * * *